United States Patent [19]

Harrison et al.

[11] Patent Number: 4,589,904
[45] Date of Patent: May 20, 1986

[54] GRANULATION OF CRYSTALLINE BY-PRODUCT AMMONIUM SULFATE

[75] Inventors: Cecil P. Harrison, Florence; Cullen G. Tittle, Tuscumbia, both of Ala.

[73] Assignee: Tennessee Valley Authority, Muscle Shoals, Ala.

[21] Appl. No.: 769,058

[22] Filed: Aug. 26, 1985

Related U.S. Application Data

[63] Continuation-in-part of Ser. No. 654,278, Sep. 25, 1984, now Defensive Publication No. T105,501.

[51] Int. Cl.$^4$ .................................................. C05D 9/00
[52] U.S. Cl. ........................................... 71/61; 71/63; 71/64.05; 71/64.13; 423/162
[58] Field of Search ................ 71/64.03, 64.05, 64.06, 71/64.13, 61, 63; 423/162, 237, 238, 242

[56] References Cited

U.S. PATENT DOCUMENTS 4,252,553  2/1981  Pircon et al. ................... 423/242 X
4,252,776  2/1981  Huckabay et al. ............ 423/131 X
4,328,189  5/1982  Haese et al. .................... 423/162 X
4,337,228  6/1982  Garrett, Jr. ..................... 423/128 X Primary Examiner—Ferris H. Lander
Attorney, Agent, or Firm—Robert A. Petrusek

[57] ABSTRACT

A process for granulating crystalline by-product ammonium sulfate, hereinafter referred to, for the sake of convenience, as A/S, to produce a product having excellent physical and chemical properties as they relate to the storage and handling thereof and also as they relate to the bulk blending of same with other fertilizer blend materials. The method involves introducing the crystalline by-product A/S feedstock, together with recycle material, into a conventional drum ammoniator granulator and granulating the mixture using A/S-sulfuric acid-alum solution and gaseous anhydrous ammonia to bind the crystals together by virtue of the fresh A/S produced and precipitated. Drying in a rotary drum dryer by countercurrent flow of hot gases instead of the more conventional cocurrent gas flow is required.

6 Claims, 1 Drawing Figure

PILOT PLANT GRANULATION OF BY-PRODUCT AMMONIUM SULFATE

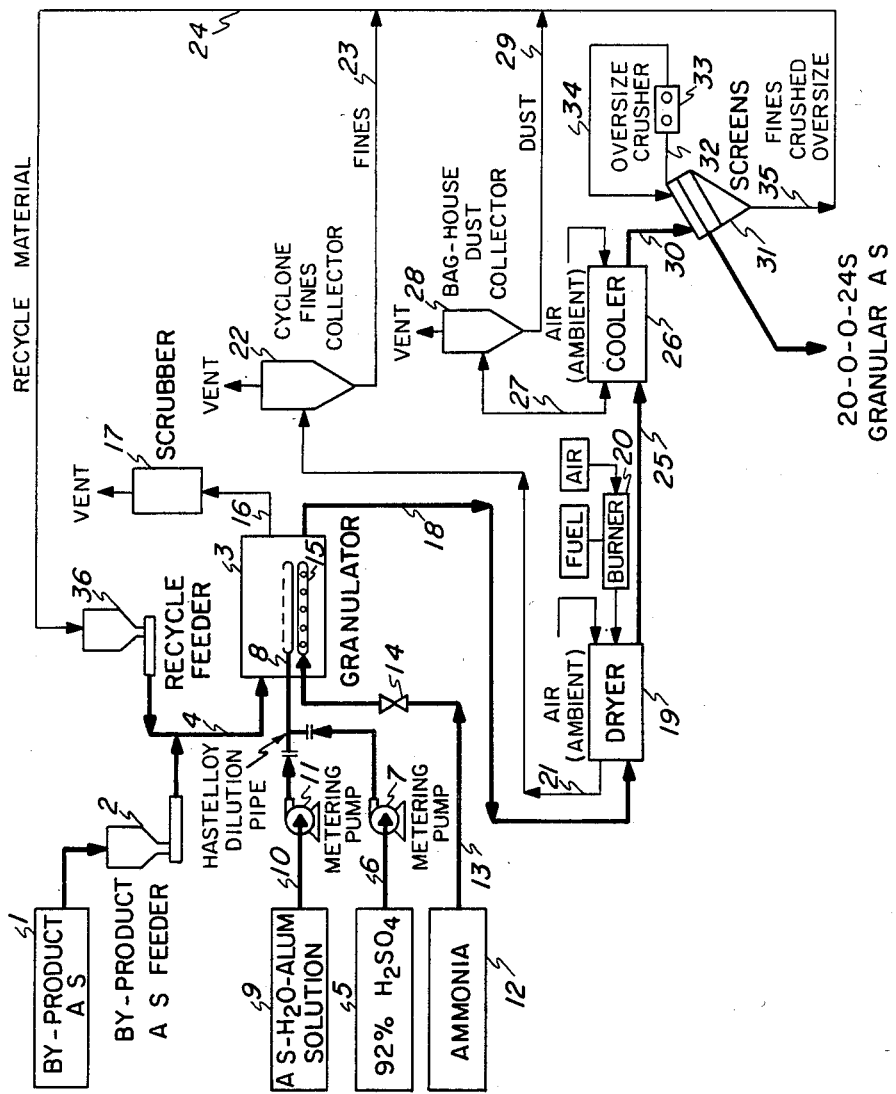

GRANULATION OF CRYSTALLINE BY-PRODUCT AMMONIUM SULFATE

This application is a continuation-in-part of application Ser. No. 654,278, filed Sept. 25, 1984, now Defensive Publication T105,501, published June 4, 1985, for Granulation of Crystalline By-Product Ammonium Sulfate.

The invention herein described may be manufactured and used by or for the Government for governmental purposes without the payment to us of any royalty therefor.

INTRODUCTION

The present invention relates to a new process for granulating crystalline by-product ammonium sulfate, i.e., $(NH_4)_2SO_4$, and to the product resulting therefrom. For the sake of convenience and brevity, said ammonium sulfate may hereinafter be referred to simply as A/S; more particularly, the present invention relates to the production of granular A/S fertilizer that has excellent handling properties and granule (particle) size and hardness which are very satisfactory either for direct application to soil environments or for blending with other granular fertilizer materials; and still more particularly, the present invention relates to a novel method for granulating fine by-product crystalline A/S with the utilization therein of only relatively small proportions of sulfuric acid and ammonia. All feedstock, A/S crystals and concentrated acid are fed directly to the granulation bed, thereby, the highly corrosive problems normally associated with the use of dilute sulfuric acid and with the manufacture of A/S are minimized.

BACKGROUND OF THE INVENTION

As is well known, both nitrogen and sulfur are only two of a plethora of chemical elements that are essential to proper nutrition of living plants. The plant nutrients, nitrogen and sulfur, are commonly classified by agronomists as primary and secondary, respectively. Both of these nutrients, of course, are required for most important farm crops, for example, cereals and fibers.

In 1983, the estimated annual production of by-product crystalline A/S in the United States was about 2 million short tons. The chief sources of by-product A/S are from the production of caprolactam, an intermediate in production of nylon, from production of methacrylates, and in the coking of coal. These by-products are commonly recovered as relatively dilute solutions which are subsequently concentrated to cause the A/S to precipitate in, for instance, a crystallizer unit as mainly fine crystals. The resulting crystalline product is separated from the mother liquor, and its primary use is in the fertilizer industry. The relatively few large crystals are separated from the multiplicity of small crystals by screening and are used mainly as direct application fertilizer or for blending with other fertilizer materials so there is a homogeneity with respect to particle sizes of the various materials.

The physical state of fine- or standard-size crystalline by-product A/S is suitable for the manufacture of chemically granulated fertilizer commonly referred to as "compound," "complex," or "cogranulated" fertilizers. In the manufacture of these types of fertilizers, all ingredients normally are mixed homogeneously prior to formation of particulate granules, with the result that each granule of the resultant fertilizer mixture contains all ingredients in the predetermined proportion and in a mechanically and/or chemically bonded, nonsegregable union. It is thusly assured that if the resulting fertilizer is applied uniformly to the soil, all ingredients therein will also be applied uniformly.

Most of the crystalline by-product A/S as recovered from the crystallizer operation supra, however, is not in suitable physical state, particularly with respect to particle size, for use in another large and important class of fertilizers generally known as "bulk blends" or "dry-mixed" fertilizers. Fertilizers of this type consist of simple, dry, mechanical mixtures of discrete, nonbonded granules of two or more chemical compositions. The granules of different composition are blended in proportions calculated to yield a mixture of the desired overall fertilizer nutrient composition. This method of fertilizer preparation, being simple and adaptable to small production operations at or near the locations of fertilizer usage, is extremely popular in the United States. However, to ensure the homogeneity within a given small volume of such dry-blended fertilizers during mixing, handling, and field application, it has been found essential that all the various ingredients be of closely matched particle size distribution (Hoffmeister, George. "Quality Control in a Bulk Blending Plant," Proc. TVA Fertilizer Bulk Blending Conference, Louisville, Ky., Aug. 1-2, 1973). Ignoring this requirement and preparing blends from ingredients of unmatched particle size, inevitably results in segregation of the various components during mixing, handling, and field application. Thus, homogeneity will be lost and the aforementioned undesirable agronomic effect of nonhomogeneous field application will be encountered.

In view of this important requirement that individual ingredients of bulk blends be matched in particle size distribution, crystalline by-product A/S cannot be incorporated properly therein because of its small particle size.

Modern fertilizer application equipment for broadcast or for row placement application of direct application solid fertilizer is designed for handling free-flowing granular type materials, such as granular or pelleted ammonia nitrate or urea. It absolutely will not properly handle such fine crystalline A/S. When attempts are made to apply nongranular materials such as said crystalline by-product A/S with use of conventional, modern-day application equipment, it has proved impossible to achieve uniform ground coverage because of ballistic action, poor flow characteristics, and bridging tendency of fine particle-size materials in the applicator. In view of these considerations, it should now be obvious to those skilled in the art just how important the present invention is to the large class of bulk-blended fertilizers.

SUMMARY OF THE INVENTION

The present invention comprises a method for converting fine crystalline A/S $(NH_4)_2SO_4$ to a large granular form suitable in particle size distribution, hardness, solubility, and other important characteristics for direct application or for addition to bulk blend fertilizers to produce homogeneous, nonsegregating blends according to the method preferred by blend manufacturers as outlined above. The present invention, as will be apparent from a reading of the description infra, details a method by which mixtures comprising from about 70 percent upwards to about 80 percent of crystalline by-product A/S and from about 20 percent to about 30 percent of equivalent A/S as sulfuric acid and ammonia is processed directly to the desired granular form by agglomeration with relatively small proportions of sulfuric-A/S solution or sulfuric acid solution along with ammonia in standard granulation equipment such as, for example, a conventional TVA rotary-type ammoniator granulator drum, as in U.S. Pat. Nos. 2,729,554 and 2,741,545, F. T. Neilson, Jan. 3, 1956, and Apr. 10, 1956, respectively, assigned to the assignee of the present invention. For purposes of teaching, disclosing, and claiming the instant invention, the teachings, disclosures, and claims of said '554 and '545, supra, are herewith and hereby incorporated herein by reference thereto.

Based on the experiences of others who have worked in this and related fields of endeavor, as for example U.S. Pat. No. 3,464,809 assigned to the assignee of the present invention, it was logically concluded that a preneutralizer would be necessary for removal of water and to minimize ammonia loss in the granulator; therefore, in our early work, a preneutralizer was therein employed. As work on the present invention progressed, it was determined that the preneutralizer was, in fact, not needed for the above purposes, and that its use only complicated the corrosion problems usually associated with handling ammonium bisulfate and/or dilute sulfuric acid.

Products made by our process in the manner described herein consist of hard, desirably sized, free-flowing granules with good handling and storage properties. The resulting material is eminently suitable for use as direct application fertilizer or for bulk-blending with other readily available dry blend fertilizer materials.

OBJECTS OF THE INVENTION

It is therefore a principal object of the present invention to develop an efficient and economical method for utilizing the fertilizer values contained in fine size crystalline by-product A/S heretofore recovered as by-product from crystallizer operation by converting said fine size crystallinze A/S material to a hard, nonfriable granular material of a size eminently suitable for use as direct-application fertilizers or for use in solid fertilizer bulk-blending operations by our new, novel, relatively simple, and improved process wherein is utilized as feed thereto, along with said fine crystalline A/S, only relatively small proportions of sulfuric acid and ammonia.

Still further and more general objects and advantages of the present invention will appear from the more detailed description set forth in the following descriptions and examples, it being understood, however, that this more detailed description is given by way of illustration and explanation only and not necessarily by way of limitation, since various changes therein may be made by those skilled in the art without departing from the true scope and spirit of the instant invention.

DESCRIPTION OF THE DRAWING

The present invention will be better understood from a consideration of the following description taken in connection with the accompanying drawing in which:

The single FIGURE is a flowsheet of the preferred pilot-scale plant arrangement generally illustrating the principles of our process which result in granular A/S produced chiefly from by-product crystalline material having the satisfactory properties herein required.

Referring now specifically to the FIGURE, by-product, standard size on fine size crystalline A/S from source 1 may be introduced by means for control of flow 2 into granulator 3 together with recycle materials, from a later-mentioned described detailed screening operation, by means of line 4 simultaneously along with sulfuric acid (92 percent $H_2SO_4$ preferred) fed from source 5 by means of line 6 and means for control of flow 7 to Hastelloy metal alloy dilution pipe-sparger 8. Simultaneously therewith A/S-water-additive solution (or A/S-acid-additive-water solution) from source 9 is fed by means of line 10 and means for control of flow 11 to Hastelloy dilution pipe-sparger 8. Simultaneously therewith gaseous anhydrous ammonia from source 12 is fed by means of line 13 and by means for control of flow 14 to stainless steel (type 316 preferred) ammonia sparger 15. In granulator 3, the wetting action of the acid solution fed thereinto together with the chemical reaction of free acid and ammonia therein causes a substantial portion of the dry solids introduced into said granulator 3 to agglomerate into the desired granular form. The resulting granular material discharging via later-mentioned line 18 from granulator 3 contains about 0.5 percent to 1.5 percent moisture as determined by the Karl Fischer method, and displays a crushing strength of the resulting minus 7- plus 8-mesh size granules in the range of about 1 to 2 pounds. During operation, ambient temperature air is caused to flow cocurrent to flow of solids through granulator 3 and is exhausted by means of line 16 to wet scrubber 17 and subsequently is vented to the atmosphere. Ammonia loss from the granulator operation is in the range of 1.0 percent to 2.0 percent of the total ammonia fed. Subsequently, granular material from granulator 3 flows by means of line 18 to dryer 19. Hot air, together with combustion products from source 20, is directed countercurrent to the flow of solids through dryer 19 to effect additional moisture removal and subsequent hardening of the granules therein. The drying gases from source 20 exit dryer 19 and flow by means of line 21 to cyclone fines collector 22 and are subsequently vented to the atmosphere. The fines collected at cyclone 22 flow by means of line 23 to line 24 which also handles recycle material from a later-mentioned and detailed screening operation. Dried granular material with moisture content (Karl Fischer method) of about 0.1 percent to 0.5 percent moisture from dryer 19 flows by means of line 25 to cooler 26. Ambient temperature air is caused to flow countercurrent to the flow of solids through cooler 26 and exits by means of line 27 to bag-house dust collector 28 where the dust is separated from the air. The air is vented to the atmosphere and the dust, by means of line 29 is transported to recycle material line 24. Granular material from cooler 26 flows by means of line 30 to screen deck 31 whereon the material is sized as desired, preferably minus 5- plus 9-mesh Tyler screen size. The oversize material from screen deck 31 flows by means of line 32 to crusher 33 wherein the oversized is partially crushed; the partially crushed material then flows by means of line 34 back to screen deck 31 for rescreening. The granulator fines and fines from the crushing operation flow from screen deck 31 by means of line 35 to recycle line 24 which transports recycle material to recycle feeder 36 and thence via line 4 to granulator 3.

DESCRIPTION OF THE PREFERRED EMBODIMENTS

In the present method for converting crystalline A/S to granular form, we have found that a mixture comprising from about 70 weight percent upwards to about 80 weight percent thereof as sulfate, together with sulfuric acid equivalent from about 20 weight percent to about 30 weight percent of the total product A/S, can be easily agglomerated in conventional granulation equipment.

When the proportions of the total sulfate, say 20 percent to 30 percent, are supplied as sulfuric acid, ammonia is added to the granulator to essentially neutralize the acid to a NH₃:H₃PO₄ mole ratio of 1.80 to 1.95; no applied heat is required for the granulation operation, the heat of reaction therefrom being sufficient. A stream of air through a conventional rotary drum or other suitable device is required to remove the water added thereto as acid solution. A small proportion of alum, as for example that described in the teachings of Australian Pat. No. 87,150,986, may, in some circumstances, be utilized beneficially in the process of the instant invention. However, other granulation aids may be used with equally good results.

The crystalline by-product A/S utilized as feedstock in the process of the instant invention as it relates to our process may be any suitable material, pure or impure, that contains chiefly this compound. Examples of such suitable materials are crystalline by-product A/S from the production of caprolactam, from coal coking, and from production of methacrylates. It is also envisioned that crystalline A/S from operations such as pollution control of fossil fuel stack-gas emissions will be suitable as feedstock for the practice of the instant process as should any other crystalline A/S from other sources. The particle size, fine size, or standard size, of by-product from the above named sources has been very satisfactory for the process so that grinding to produce fines has therefore been unnecessary. If grinding should prove to be necessary, the crystalline A/S may be milled alone or in combination with oversized and/or undersized product recycled from a later mentioned screening operation in the process.

The preferred liquid binder used in the practice of the present invention is an aqueous solution of sulfuric acid. Industrial-grade sulfuric acid is preferred because of economics and reduced corrosion problems, but certain spent sulfuric acids from other processes may also be utilized if economics dictate. The preferred concentration of spent sulfuric acid used in the present granulation process is 30 percent to 60 percent with the most preferred concentration being about 45 percent. In preparation of such acid solutions if desired, a small amount of commercial-grade alum, equivalent to about 0.05 weight percent aluminum in the final A/S product, may be dissolved in the water-A/S acid dilution solution. Other materials, such as iron sulfate or magnesium sulfate, are also satisfactory as granulation-aid additives in place of said aluminum sulfate. The solutions, 92 percent sulfuric and water-A/S-alum, at ambient or at elevated temperature are metered and transported by means of ordinary type 316 stainless steel pipe to a Type B Hastelloy dilution-sparger pipe located at the granulator so as to minimize the corrosion problems encountered with dilute sulfuric acid. If the granulation process is carried out juxtaposed the location wherein by-product A/S is produced, the A/S saturated acid solution would be prepared by adding the 92 percent acid and water to the already available saturated crystallizer solution. The proportion of the preferred sulfuric-A/S solution should, for best results, be about 35 percent by weight of the total feedstock. When the final product contains about 80 percent of by-product A/S and about 20 percent new A/S, about 4 percent of the by-product may be introduced with the acid solution and the remainder is fed as dry material. In our earlier work, we had indications that small amounts, i.e., 4 percent to 15 percent, for example, of the solid A/S by-product should be so diverted to be incorporated in said acid solution. Our later work indicates that this is not critical to the operation of our process; however, it is still a desirable practice in that such incorporation therein effectively increases the ratio of by-product crystalline material: A/S formed by the reaction of acid and ammonia fed to the process. The acid content of the solution binder is reacted with gaseous anhydrous ammonia fed through a drilled pipe sparger located beneath the surface of the granulation bed. The ammonia feed is adjusted to effect a product pH in the preferred range of about 2.0 to 2.5. For an understanding of the significance of the such adjustments see, for example, U.S. Pat. No. 3,351,455, W. L. Burns, Nov. 7, 1967.

Contacting of the A/S acid solution binder with the crystalline by-product A/S feed material and ammonia may be effected in any suitable manner deemed desirable to achieve granulation. For example, the properly sized solid by-product feedstock, together with recycle material, can be fed to a conventional rotary drum-ammoniator-granulator or to a number of other suitable granulating devices, and the A/S-acid solution can be sprayed or streamed simultaneously onto the feedstock soon after it enters the granulator. The preferred method for introducing the A/S-acid solution is to sparge it beneath the granulation bed. This procedure eliminates any acid mist that may occur by the above-mentioned procedures. Gaseous anhydrous ammonia is introduced beneath the bed of material maintained in the granulation device and downstream from the entrance point of the solution binder thereinto. By proper adjustment of process variables including raw material feed rates, mainly of recycle and/or dry by-product A/S, and acid solution, granulator rotation speed and slope, retention time, placement of liquid binder, and other pertinent variables, a granular product containing a high proportion of granules of the desired particle size can be discharged from the granulating device. Granules thus discharged immediately exhibit moderate hardness and mechanical stability, due, apparently, to the bonding action of the chemical reaction of the acid-A/S solution and ammonia according the following equations:

$$NH_4HSO_4 + NH_3 \rightarrow (NH_4)_2SO_4$$

$$H_2SO_4 + 2NH_3 \rightarrow (NH_4)_2SO_4$$

In pilot-scale continuous-granulation plant, the moisture content of granular material discharged from the granulator is in the range of about 0.5 percent to 1.6 percent by weight; therefore, drying may simply be accomplished, for example, by passing the material through a conventional, rotary-type dryer equipped with lifting flights. Heat to the dryer may be supplied by any manner of means such as, for example, air heated with a propane burner. Hot air, together with the combustion products, preferably flow countercurrent to the flow of solids in the dryer and are temperature controlled so that the temperature of the discharging solids is maintained in the range of about 240° F. to about 300° F.

Screening may be done in any manner convenient including the usual method employing stacked vibrating screens. A typical screen stack to be employed for production of granules that will match the size of most granular fertilizers consists of 5-mesh and 9-mesh screens (Tyler screen series). Oversize material, meaning that not passing the 5-mesh screen, may be pulverized and recycled to the granulator along with the crystalline by-product A/S feed. Undersized, meaning that passing the 9-mesh screen, may be recycled either with or without pulverization thereof.

EXAMPLES

In order that those skilled in the art may better understand how the present invention can be practiced, the following examples are given by way of illustration and not necessarily by way of limitation.

EXAMPLE I

A very satisfactory product containing 20.3 to 20.5 weight percent nitrogen (all percents are given in this and the following examples by weight percent unless otherwise indicated), 24 percent sulfur, and 0.23 percent moisture was granulated continuously in a pilot-scale operation of 4.5 hours run time at a production rate of 1000 pounds per hour from a feed comprising 70 percent commercial standard size (run-of-pile) by-product A/S and 30 percent A/S made from sulfuric acid and gaseous anhydrous ammonia. About 96 percent of the by-product feedstock supra was fed to the process as dry feedstock and the remainder, about 4 percent, was dissolved in the water of dilution into which has already been added alum if desired, said water of dilution to be later admixed with the sulfuric acid utilized in this process to make said 30 percent fraction feed produced by reacting said sulfuric acid and gaseous ammonia to produce A/S solution and introduced to the process therein incorporated. As noted, the acid solution contained a small quantity of alum, equivalent to about 0.04 percent aluminum in the final product, as granulation aid. The dry by-product A/S feedstock was fed to the recycle transport system by means of a belt-type feeder. Mixing of by-product and A/S recycle materials occurs during transport to the granulator. The granulator was a rotary drum 3 feet in diameter by 6 feet long and was inclined with a slope of about 0.58 inches per foot from the feed end to the discharge end. The granulator was fitted with a $9\frac{1}{2}$-inch high retainer ring at the feed end and with a 9-inch high retainer ring that was positioned 4 feet down stream from the feed end of the drum so that the active area of the drum was 4 feet in length. The granulator was equipped with an ammonia sparger, a $\frac{3}{8}$-inch-diameter stainless steel tube about 2.5 feet long that contained four $\frac{1}{4}$-inch-diameter openings spaced 6 inches apart. The sparger was positioned beneath the surface of the rolling granulation bed and near its center with respect to its depth so that the sparger openings were directed upstream into the flow of solids. The solution phase, 92 percent sulfuric acid and water-A/S-alum solution were introduced to the granulator by means of a sparger located beneath the surface of the granulation bed. The solution sparger was a $\frac{1}{4}$-inch closed end Hastelloy (type B) pipe about 2.5 feet long that contained six $\frac{1}{8}$-inch openings that were spaced on 4-inch centers. Both the solution and ammonia spargers were welded to a $\frac{1}{2}$-inch rod in a manner so that the solution sparger openings faced upward and 90 degrees from the ammonia sparger openings. The solution sparger was downstream, in regard to passage of solids, from the ammonia sparger. A solution of acid, A/S, and water was metered to the sparger by means of metering pumps; ammonia was metered by means of a rotameter. Residence time in the granulator was about 5 minutes.

The dryer was a rotary drum 3 feet in diameter by 24 feet long. The drum was equipped with lifting flights. Retainer rings at the feed and discharge ends were 8 inches and 5 inches high, respectively. The unit was insulated with a 2-inch-thick layer of magnesia. The unit was hooded at both feed and discharge ends. The drum was rotated at 6 revolutions per minute. The dryer was equipped so that airflow through the unit was countercurrent. Propane was used as the heat source for drying. The preferred drying arrangement for the process, as shown for example in the FIGURE, was countercurrent flow of air to flow of solids. The discharge end hood door was opened and the propane burner tip was located about 18 inches from the dryer discharge end and the flame was controlled so that the temperature of the granular discharge product was about 270° F. to 300° F. Countercurrent airflow through the dryer at about ambient temperatures (70° F. to 80° F.) was at a rate of about 1740 ft$^3$/min; exit air temperature ranged from about 120° F. to 155° F. The heat requirement was about 0.9 million Btu's per ton of product. Residence time in the dryer was about 15 minutes.

The cooler was a rotary drum $2\frac{1}{2}$ feet in diameter by 20 feet in length and was equipped with lifting flights. The retainers at the feed and discharge ends were $4\frac{1}{2}$ inches and $3\frac{1}{4}$ inches high, respectively. The unit was rotated at 11 revolutions per minute. In operation, an induced blower was used to cause a stream of ambient air to flow countercurrent to the flow of solids through the unit. Residence time in the unit was about 12 minutes.

A double deck vibrating screen with 12 square feet of active area was used to size the cooler product. Screen (Tyler mesh) sizes were 5 mesh (top) and 9 mesh (bottom). A chain mill, operated at about 1650 revolutions per minute, was used to crush oversize material. The crushed material was returned to the screen deck for rescreening. Fines, from granulation and from crushing, together with some onsize material were returned as recycle.

In the startup operation, the system was loaded with recycle material from a previous operation. The plant equipment was put into operation. Then, the feedstock (A/S-acid solution, ammonia, and by-product crystals) were started. The duration of a test was usually about 5 to 6 hours. At the end of each granulation test the pilot plant was shut down and left loaded with material for the next startup.

Granulation during the pilot-plant run was very good; onsize (minus 5- plus 9-mesh) product was 51 percent and granule (minus 7- plus 8-mesh size) crushing strength was about 2 pounds before drying. Temperature of the granulator product was about 200° F. The recycle to product weight ratio was 4:1. Moisture content of the granulator product was 0.7 percent by the Karl Fischer method and 1.1 by the AOAC method at 130° C. Ammonia loss was 1.7 percent which, of course, could have been avoided by scrubbing the exhaust gases with incoming acid in a plant of commercial size.

After drying, the product temperature was 290° F. and moisture was 0.2 percent and 0.4 percent by the Karl Fischer and AOAC method, respectively. Granule (minus 7- plus 8-mesh size) crushing strength was 5 pounds, which is considered in the industry to be excellent; 3.0 pounds is considered to be acceptable.

The temperature of the cooler discharge product was 245° F.; the screening and crushing operation was good. This high discharge temperature was due only to the inefficiency of this particular cooler and was not a condition necessary for good operation. A temperature of about 150° F. is preferred. About 57 percent of the cooler product was on size (minus 5- plus 9-mesh); granule (minus 7- plus 8-mesh size) crushing strength was 5 pounds and moisture content was 0.2 percent to 0.3 percent by the Karl Fischer and AOAC at 130° C. method, respectively.

Chemical analysis of the product (as weight percent) was 20.3 percent nitrogen, 72.3 percent $SO_4$, and 0.04 percent aluminum; the $NH_3:SO_4$ mole ratio was 1.93. The product has good appearance and has exhibited excellent handling and storage properties; density, loose-pour, is about 56 pounds per cubic feet and angle of repose is about 38 degrees.

EXAMPLE II

Very satisfactory granular A/S product was made in continuing pilot-scale operation at a production rate of 1000 pounds per hour from 75 percent crystalline by-product A/S and 30 percent A/S from acid and ammonia. In this test (5.0 hours) the by-product A/S was fed to the process in the same manner as described in Example I supra; i.e., about 96.3 percent was fed as dry material and 3.7 percent was dissolved in the solution phase. The procedure utilized was the same as in Example I supra. During this test, there was no significant operating problems. Material at about 170° F. discharging from the granulator contained about 67 percent onsize material; moisture Karl Fischer content was about 1.6 percent and crushing strength of the minus 7- plus 8- mesh size granules was 1.2 pounds. After drying, moisture content was 0.3 percent and granule (minus 7 plus 8 size) crushing strength was 5.0 pounds. The recycle ratio (lb/lb product) during the test was about 3.5:1. Chemical composition of the product as weight percent was 20.5 nitrogen, 70.4 $SO_4$, and 0.05 aluminum. Produce pH was 1.99.

EXAMPLE III

Very satisfactory granular A/S product was made in continuous pilot-scale operation at a production rate of 1000 pounds per hour from 80 percent crystalline by-product A/S and 20 percent A/S from acid and ammonia. In this test (13.5 hours) the by-product A/S was fed to the process in the same manner as described in Example I supra; i.e., about 96 percent was fed as dry material and about 4 percent was dissolved in the solution phase. The procedure utilized therein was the same as in Example I supra. During this test, there were no significant operating problems; granulation was good and the overall operation was very satisfactory during the extended 13.5 hour pilot-plant run. Material at about 155° F. discharging from the granulator contained about 40 percent onsize material; moisture (Karl Fischer) content was 1.1 percent and crushing strength of the minus 7- plus 8-mesh size granules was about one pound. After drying, moisture content was 0.2 percent and granule (minus 7 plus 8 size) crushing strength was about 5 pounds. The recycle ratio (lb/lb product) during the test was about 3:1. Chemical composition of the product as weight percent was 20.4 nitrogen, 72.0 $SO_4$, and 0.04 aluminum. Product pH was 2.4.

EXAMPLE IV

Negative Example—Cocurrent Drying

In this series of tests, using the same pilot-plant equipment as in Example I supra but with cocurrent drying granule, hardness and stability of the resulting product was not satisfactory, and the process generation of dust was intolerable. In these tests, the inlet drying air temperature to the feed end of the dryer ranged from 325° F. to 500° F. but granule hardness (crushing strength) after drying was only about one pound even though moisture content of the product was in the range of about 0.1 percent by the Karl Fischer method. The proportion of by-product fed in these tests was that for 70 percent of the final product. The chemical composition of the products was 20 percent nitrogen and about 73 percent $SO_4$; the $NH:SO_4$ mole ratio was in the range of 1.84 to 1.89 and pH was 2.0 to 2.4.

INVENTION PARAMETERS

After sifting and winnowing through the data herein presented as well as other results and operations of our novel process for producing granular A/S chiefly from by-product A/S which product granular A/S is eminently suitable for direct application to the soil or for use in the bulk blending segment of the fertilizer industry, the operation variables and preferred conditions for carrying out our process are summarized below:

| OPERATING CONDITIONS | | |
|---|---|---|
| Variables | Limits | Preferred |
| By Product ammonium sulfate[a] feed to granulator Particle size % passing 20 mesh Tyler screen | 30–100 | 40–95 |
| Solution feed to dilution sparger Sulfuric acid[b] concentration, wt % | 30–98 | 90–92 |
| Solution for acid dilution A/S—Water solution, lb. A/S/lb. $H_2O$ | 0–0.4 | 0.1–0.2 |
| Acid—Water—A/S solution for granulation, wt % $H_2SO_4$ | 30–60 | 40–55 |
| Granulation discharge Temperature, °F. | 100–250 | 150–225 |
| Moisture (Karl Fischer) content of material, wt % | 0.2–3.0 | 0.1–2.5 |
| Mole ratio, $NH_3:SO_4$ | 1.80–2.00 | 1.85–1.98 |
| pH (10% by weight in $H_2O$) | 1.80–2.60 | 2.20–2.50 |
| Dryer discharge Temperature, °F. | 250–325 | 270–300 |
| Moisture (Karl Fischer) content of material, wt. % | 0.1–1.0 | 0.2–0.5 |
| Recycle material Temperature, °F. | 70–250 | 100–200 |

[a]Crystalline by-product ammonium sulfate from production of caprolactam, methacrylates, coking coal, fossil fuel stack scrubbing, or any similar process.
[b]Industrial grade sulfuric acid, 92% $H_2SO_4$.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. An improved process for utilizing by-product crystalline A/S for the production of high-purity granular A/S product of predetermined, closely controlled particle size eminently suitable for either subsequent direct application to soil systems or for utilization in fertilizer bulk blending operations, which improved process comprises the steps of:

(a) maintaining in an inclined rotating rotary ammoniator-granulator-type drum a rolling bed of discrete particles therein of crystalline by-product A/S and recycle material, said recycle material introduced therein from step (e) infra;

(b) continuously introducing into the upper end of said inclined rotating drum a stream of crystalline by-product A/S and recycle material;

(c) continuously introducing into said inclined rotating drum separate streams of sulfuric acid-A/S solution and gaseous anhydrous ammonia beneath the surface and near the center of the rolling granulation bed, with respect to its depth, the relative proportion of said sulfuric acid and said ammonia introduced into said rotating drum granulator being maintained so as to yield a mole ratio of $NH_3:SO_4$ in said granular A/S product ultimately removed therefrom in the range from about 1.80 to about 1.95;

(d) continuously introducing into the upper end of said inclined rotating drum fines and crushed oversize ammonium sulfate product recycled thereto from a later-mentioned sizing step;

(e) admixing said by-product crystalline A/S and said recycle material with sulfuric acid-A/S solution and ammonia in predetermined portions and for a time sufficient so as to effect agglomeration by both the chemical reaction and rolling action imparted by the rotating drum to said mixture of dry crystalline by-product A/S and recycle material;

(f) maintaining the materials introduced into said inclined rotating drum at a temperature and for a time sufficient to effect therein the agglomeration of granules of crystalline ammonium sulfate of size sufficient to range from between about 40 percent to about 90 percent minus 5- plus 9-mesh Tyler screen series;

(g) continuously discharging at least a portion of the granular material resulting from step (f) supra from the lower end of said inclined rotating drum and introducing same into drying means;

(h) maintaining the material introduced into said drying means at a temperature and for a time sufficient therein to reduce the moisture content thereof to the range of from about 0.1 percent to about 1.5 percent by weight and subsequently introducing same into cooling means;

(i) contacting the material in said cooling means with countercurrent flow of ambient temperature air for a time sufficient therein to reduce temperature of the A/S material therein to the range of from about 200° F. to about 260° F.;

(j) subsequently removing the resulting cooled material from said cooling means in step (i) supra, and introducing into sizing means wherefrom product A/S granules ranging from about minus 5- to plus 9-mesh Tyler are recovered and withdrawn to storage and wherefrom undersize and crushed oversize are recycled to said feed-end of said inclined rotating granulation drum.

2. The process of claim 1 wherein said sulfuric acid-A/S solution has an initial concentration in the range from about 40 percent to about 60 percent by weight $H_2SO_4$.

3. The process of claim 2 wherein the concentration of sulfuric acid ranges from about 35 percent to about 55 percent by weight $H_2SO_4$.

4. The process of claim 2 wherein the quantity of said sulfuric acid-A/S solution introduced into the upper end of said inclined rotating drum is utilized in proportions such that it ranges from about 12 percent to about 30 percent by weight, on an A/S basis, of the total A/S introduced into said inclined rotating drum.

5. The process of claim 2 wherein the temperature in said inclined rotating drum is maintained in the preferred range of about 150° F. to about 200° F.

6. The process of claim 1 wherein the handling of dilute sulfuric acid and/or ammonium sulfate occurs substantially at the granulator dilution sparger; said process characterized by the fact that it may therefore be utilized in current day existing fertilizer granulation plants with substantially no changes required of the mechanical requirements therein.

* * * * *